Figure 1:
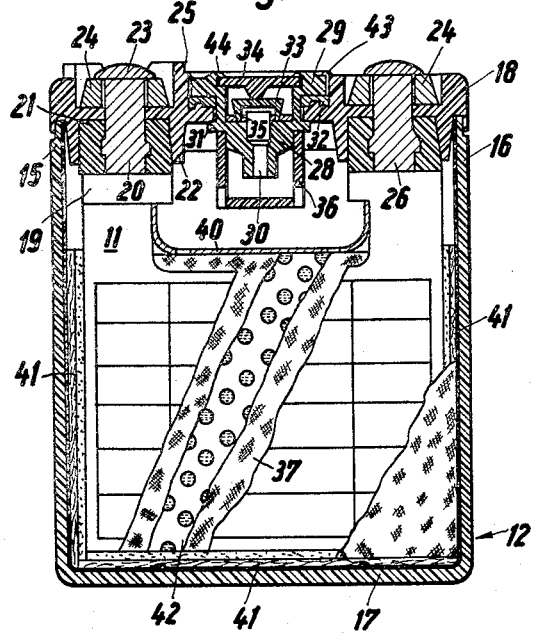

Inventor:
OTTO JACHE

United States Patent Office 3,177,096
Patented Apr. 6, 1965

3,177,096
ELECTRICAL ACCUMULATOR
Otto Jache, Budingen, Upper Hesse, Germany, assignor to Accumulatorenfabrik Sonnenschein G.m.b.H., Budingen, Upper Hesse, Germany, a limited-liability company of Germany
Filed Apr. 8, 1963, Ser. No. 271,223
Claims priority, application Germany, Apr. 10, 1962, A 39,921
4 Claims. (Cl. 136—6)

My invention relates to an electrical accumulator or storage device and, more particularly, to an electrical accumulator of the non-spillable type having a sealed housing which encases at least one pair of electrodes of opposite polarity and the electrolyte surrounding said electrodes and including an aqueous solution, having a vapor pressure considerably exceeding that of the atmosphere. More specifically, my invention is applicable to an electrical accumulator of the lead-acid type in which the electrolyte is an aqueous solution, the housing being normally sealed and provided with a safety valve which remains closed during normal operation including a normal charging process and will not open unless an excessive gas pressure should develop within the housing owing to a faulty charging operation involving an excessive development of gases.

While the housing of an ordinary accumulator of the lead-acid type must be re-plenished with water in regular intervals for replacement of the loss of water evaporated from the electrolyte and, for this purpose, is equipped with removable plugs provided with vents, this necessity does not exist with accumulators of the non-spillable type having a sealed housing and being capable of storage over a considerable period of time. Such non-spillable accumulators offer the advantage of a simplified operation and the additional advantage that the accumulator will not be damaged by a faulty re-plenishing operation.

The housing of a conventional accumulator or storage battery of the lead-acid type consists of a suitable plastic, such as polystyrene. Where the housing of an accumulator of the non-spillable type consists of the same material, the surprising fact has been discovered that, in spite of the equipment of the housing with sealing means, the quantity of the electrolyte decreases after an extended period of operation.

It is the primary object of the invention to prevent such decrease of the volume of the electrolyte and, more particularly, to so construct the housing of an electrical accumulator that the walls thereof have an extremely low diffusivity preventing the water of the aqueous electrolyte from diffusing through the housing walls and being evaporated into the atmosphere.

My invention relates to a proposition based on the discovery that the decrease of the volume of the electrolyte is due to the fact that most plastic materials, such as polystyrene, permit the molecules of water to pass therethrough owing to diffusion, the diffusion depending on the following factors:

(1) The quantity of water that may be absorbed by a plastic in dissolved condition, when the plastic is saturated with water, (2) The velocity of diffusion of the water molecules through the plastic, (3) The difference of the partial water vapor pressure of the liquid electrolyte and the partial water vapor pressure of the atmosphere surrounding the accumulator housing, (4) The thickness of the walls of the accumulator housing.

As the water vapor pressure of the acid electrolyte of an accumulator of the lead-acid type exceeds considerably the water vapor pressure prevailing in the surrounding atmosphere, much more molecules will pass from the inside to the outside of the housing walls than will pass from the outside to the inside therethrough. This causes a gradual decrease of the quantity of the electrolyte contained in the housing, even though the housing is free of any vents.

I have found that the quantity of the electrolyte can be prevented from decreasing owing to diffusion, where the walls of the housing are so constructed as to have a minimum of diffusivity. For this purpose I construct the walls of the housing in accordance with the rules conventionally observed in the construction of the sheathings of subterraneous cables. In subterraneous cables too it is a requirement that diffusion of water or water vapors through the sheathing is safely prevented. Numerous designs of the sheathing of subterraneous cables have been developed and are known in the art which will meet this requirement. The same principles of construction which have been found satisfactory for the sheathing of subterraneous cables are apt, when applied to the walls of the accumulator housing, to attain the objects of my invention. Thus, the housing wall may be composed of a plurality of layers at least one of which is so constructed as to prevent diffusion of any substantial quantity of water or water vapors therethrough. This layer may be included between other layers, such other layers imparting the required strength and rigidity to the wall. More particularly, the anti-diffusion layer may be formed by a non-porous layer of metal.

Electrical accumulators of the non-spillable type capable of storage over a considerable period of time and provided with a metal housing are old in the art. These prior accumulators, however, have an alkaline electrolyte of a hygroscopic character having a partial water vapor pressure which does not or not materially exceed the water vapor pressure of the atmosphere so that the number of molecules passing through the walls from the outside to the inside do not or do not materially exceed the number of molecules passing from the inside to the outside through the housing walls. Therefore, such accumulators having an alkaline electrolyte do not loose water during storage.

Reverting to the above-cited four factors controlling the diffusion of water molecules through the housing walls of the accumulator and thus controlling the loss of water, it will be appreciated that the factors (1) and (2) can be controlled by a suitable selection of the plastic used for the wall; that factor (3) depends on the conditions of operation of the accumulator; and that factor (4) depends on the thickness of the housing wall.

Considering the influence of factor (3) on the diffusion, it will be appreciated that elevated temperatures during storage or during operation of the accumulator affect the diffusion adversely, particularly, where the surrounding atmosphere is dry or, in other words, has a low partial water vapor pressure compared with that of the electrolyte inside of the housing.

As far as factor (4) is concerned, it will be appreciated that accumulators having thick housing walls have lower water losses during storage and operations than accumulators having thin housing walls. Therefore, my invention is of particular importance for accumulators provided with thin-walled housings, such as housings for small accumulators.

The factors (1) and (2) deserve particular consideration for an accumulator of the type having a housing consisting of a plastic. Such plastics should be avoided which have a high water absorption and a high diffusion speed. More or less satisfactory may be plastics in which one of the two properties comprising the water absorption and the diffusion speed is low. The plastics used heretofore for producing accumulator housings or parts thereof, such as polystyrene, are not satisfactory at a temperature of 40° C. or more, this being the upper temperature limit for operation or storage of the accumulator, particularly, where the wall has a thickness of 3 mm. or less, as conventional in accumulators of smaller sizes. Other plastics, having more favorable properties, are not eligible for various reasons, for instance, on account of insufficient strength, of insufficient chemical resistance or of insufficient molding properties.

Just as the sheathing of a subterraneous cable consisting of a plurality of layers, the layers forming the housing wall of my novel accumulator, in principle, have the following different functions:

(1) Providing for a rigid supporting structure,
(2) Reducing the diffusivity to a minimum,
(3) Protecting the wall from corrosion owing to chemical influences.

It is possible that one of the layers of the wall serves dual functions. This may be explained by reference to various embodiments of my invention described hereinafter.

*Example 1*

The supporting structure of the housing wall consists of a layer of a synthetic resin, such as polystyrene, having the required strength. Polystyrene, however, has a high diffusivity for water molecules. A second layer serving to reduce the total diffusivity of the wall is formed by one or more coats of an organopolysiloxane covering the inside of the polystyrene layer so as to be in contact with the electrolyte or the vapors above the level thereof. Such a coat or coats will considerably reduce the diffusion of water molecules through the wall of the accumulator.

*Example 2*

The supporting structure of the wall consists of a comparatively thick layer of polystyrene which is acid-resistant and will not be corroded by the electrolyte. The inner surface of the housing is provided with a thin layer of polyvinylidene (i.e. polymerized asymmetrical dichloroethylene) chloride representing a plastic having an extremely low diffusivity. This layer of polyvinylidene (i.e. polymerized asymmetrical dichloroethylene) chloride may be formed by a thin sheet covering the thick layer of polystyrene and being in contact with the electrolyte and the vapors thereof.

The layer of polystyrene may have a thickness of from 1 to 2 mm., preferably 1.5 mm. and the thin layer of polyvinylidene chloride may have a thickness of 0.1–0.2 mm., preferably of 0.15 mm. Where the thin layer has a thickness of $\frac{1}{10}$ of that of the thick layer, satisfactory results have been obtained. The thin layer will reduce the total diffusivity to $\frac{1}{10}$ of that of the polystyrene layer. As both plastics are acid-resistant, a third layer is not required.

*Example 3*

The walls of the housing comprise a comparatively thick layer of polystyrene and a thin layer of metal. The metal layer may be formed by a coat produced by deposition of metal vapors in an evacuated space or by an electrolytic process, as is well known in the art. Where the metal is non-acid-resistant, such as aluminum, the layer may be protected by a suitable plastic coat which is acid-resistant. The thickness of the metal layer may amount to 4 micron. The metal coat may be provided on the outside of the supporting polystyrene layer.

*Example 4*

The supporting structure of the wall of the accumulator housing consists of a metal sheet, such as a sheet of copper or aluminum having a thickness of about 1 mm. On its inside the metal layer is coated with a protective acid-resistant plastic, such as polyvinyl chloride. The metal has a zero-diffusivity for water molecules.

*Example 5*

The housing wall of the accumulator is composed of an outer thin layer of polyvinyl chloride having a thickness of about 0.1 mm., a central layer of polystyrene having a thickness of about 1.0 mm. and an inner coat of organopolysiloxane having a thickness of 0.2 mm.

Numerous other examples may be easily derived from the art of subterraneous cables, as above explained. In selecting an appropriate combination of layers particular consideration should be given to the necessity that the various layers will firmly adhere to each other. If necessary, the layers may be bonded to each other by welding or by the use of an adhesive so as to prevent an escape of water vapors passing through passage-ways formed between the individual layers and communicating with the atmosphere at the junctions of housing parts, for instance at the joint between the body and the cover of the housing.

Figure 2:
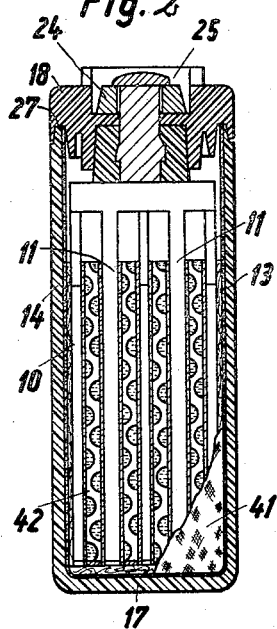
Figure 3:
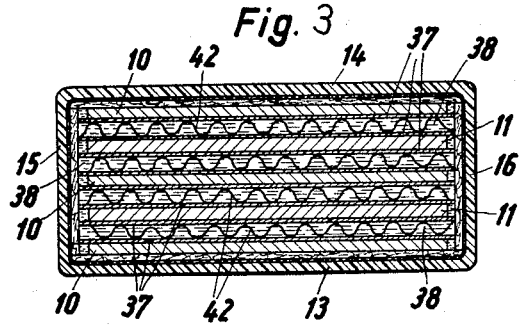

A lead-acid-accumulator of the non-spillable type to which my invention is particularly applicable forms subject matter of my co-pending patent application Serial Number 85,415, filed on January 27, 1961. This accumulator will be briefly described hereinafter with reference to the accompanying drawing in which FIG. 1 is a vertical section through the accumulator taken along a plane extending parallel to the electrode plates, the latter being partly shown broken away to expose an intermediate spacer to view, FIG. 2 is a vertical section taken along a plane extending at right angles to the plane of FIG. 1 and FIG. 3 is a horizontal section taken through the accumulator shown in FIGS. 1 and 2.

The storage battery of the lead-acid type shown in the drawings comprises a plurality of spaced flat plates 10 constituting the negative electrodes, a plurality of flat plates 11 interleaved between and disposed in spaced relationship to the negative electrodes 10 and constituting the positive electrodes 11 and an acid electrolyte. The plates 10 and 11 are formed by grids consisting of a suitable lead alloy and by a porous active material filling the interstices of the grids.

The electrodes are mounted within a rectangular housing 12 having a front wall 13, a rear wall 14 parallel thereto, parallel side walls 15 and 16, a bottom wall 17 integral with the walls 13–16 and a cover 18 fixed to the housing in a suitable manner. Each of the walls and the cover may be constructed in accordance with any one of the above examples. The positive electrodes 11 are connected by a horizontal bridge member 19 integral with projections thereof and with a pole member 20 which extends through a hole provided in the cover 18 and is fixed to the cover in the conventional manner. For that purpose, the pole member has a peripheral bead and is embedded within an annular member 21 of a rubber firmly seated on the inner face of the cover and on the inside of an annular flange 22 molded thereon. The pole member 21 projects above the cover 18 and is provided with a head 23 of silver resting on and soldered to an annular lead member 24 placed on the top of cover 18 and surrounding the pole member 20 and being itself surrounded by a recessed protective annular member 25. The cables to be connected with the storage battery are provided with terminal members adapted to establish an electrical contact with the pole heads, such as 23, and it is the purpose of the protective annular member 25 to prevent the attachment of the negative terminal member and to permit attachment of the positive terminal member only.

The negative electrodes 10 are likewise connected by and integral with a horizontal bridge member which is similar to member 19 and is integral with a pole member 26 which is shaped and mounted similarly as pole member 20 so that a detailed description of such mounting may be dispensed with. It may be mentioned, however, that the negative pole member 26 is not surrounded by a protective annular member, such as 25.

The bottom face of the cover 18 is provided with a circumferential groove 27 engaging over the upper edge of the housing walls 13–16 in a sealed manner. The central portion of the cover 18 is provided with an aperture, and a spring-loaded pressure relief valve is mounted on the cover 18 to close the aperture but to open outwardly under the effect of excessive internal pressure that might develop within the housing owing to the development of gases produced in the charging operation.

The pressure relief valve comprises a substantially cup-shaped valve body 28 of polystyrene having an external upper flange 29 and a bottom provided with a central valve passage-way 30 and with a peripheral flange 31 which underlies the cover 18 and constitutes bayonet locking means for securement of the valve body in the cover 18. For that purpose, the flange 31 is provided with a plurality of circumferentially distributed spaced recesses and the edge of the central aperture of the cover is likewise provided with a plurality of circumferentially distributed spaced recesses so that the valve body may be inserted from the outside through the aperture, after the sections of the flange 31 have been brought into registry with the recesses in the edge of the aperture. After the body has been so inserted into the opening it may be turned to thereby bring the sections of flange 31 out of registry with the recesses of the cover 18.

Preferably, the cover is provided with an annular bead surrounding its central aperture and engaging a seal ring 32 interposed between the flange 29 and the cover 18 and consisting of a rubber which is compressed, when the valve body is inserted in the cover to thereby provide a tight seal.

The upper mouth of the passage-way 30 is surrounded by an upstanding lip provided upon the bottom of the cup-shaped valve body and this bottom constitutes a valve seat for cooperation with the edge of a valve member 33 of inverted cup-shape yieldingly held in closed position by a lower central projection of a horizontal plate 34 which is carried by the cup-shaped valve body 28 and engages an inner peripheral groove provided at the top thereof. Preferably, the valve member 33 consists of an elastic material, such as rubber, which will yield, when excessive pressure acts upon the bottom side of the valve member 33 permitting same to rise sufficiently to relieve such pressure.

Preferably, the valve seat formed by the top surface of the bottom of the cup-shaped valve body 28 is covered by a suitable deformable sealing medium of liquid or paste-like consistency and preferably consisting of a hydrophobe material, such as silicon oil or grease. This sealing medium which is indicated at 35 is prevented by the lip surrounding the upper mouth of the passage-way 30 from escaping through the latter.

A protective cage 36 of polystyrene surrounds the inwardly projecting portion of the valve body 28 and is suitably fixed thereto.

The opposed faces of the electrodes 10 and 11 are covered by layers 37 of a suitable porous fibrous material. These layers constitute side walls of hollow spacers having interior pockets containing a corrugated and perforated thin sheet 42 preferably consisting of a suitable plastic, the corrugations extending parallel to the walls 13–16 as will appear from FIG. 3.

An acid electrolyte fills the space between the electrodes 10 and 11 including the pockets 38 and including the pores of the fibrous layers 37. This electrolyte is formed by a thixotropic hydrogel constituting a colloidal solution of an additive in a diluted acid.

This additive is formed by a finely dispersed material which while insoluble in the diluted acid is capable of forming a colloidal solution therewith which constitutes a thixotropic hydrogel, i.e. a gel which, when agitated, becomes liquid and congeals again after the agitation has ceased.

The pocket which is formed by a pair of layers 37 and includes a corrugated sheet 42 of polyvinyl chloride may be closed at the sides and at the bottom but may be open at its top. In this event, the battery is provided with a substantially rigid sheet 40 interposed between the horizontal bridge members, such as 19, and extending from the end wall 15 to the end wall 16 of the housing and across the open tops of the pockets to close the latter. This sheet 40 which may consist of polystyrene, is preferably perforated so as to permit passage of the diluted sulphuric acid, when the same is poured into the housing through the aperture of the cover 18 after removal of the valve body 36.

Each pocket may be closed along its lateral margins and its lower margin by stitches connecting the edges of the opposed fibrous layers. Alternatively, however, additional fibrous sheets 41 consisting of the same or of a similar material as the layers 37 may cover the internal faces of the walls 13–17 and may contact the edges of the electrode plates 10 and 11 and the edges of the layers 37 to thereby close the pockets at the sides and at the bottom.

The corrugated sheets 42 subdivide the body formed by the gel in each pocket into a plurality of columnar portions communicating with each other through the perforations of the spacer sheet. In this manner, the corrugated sheet will contribute to the stability of the gel.

The valve body 36 may be secured against accidental rotation and removal by a circumferential welding seam as indicated at 43. In a similar manner, the plate 34 may be held in position by a welding seam 44.

It will be obvious to those skilled in the art to which the invention appertains that the same may be incorporated in several different constructions. The accompanying drawing, therefore, is submitted merely as showing the preferred exemplification of the invention.

What I claim is:

1. A sealed, non-spillable type electrical accumulator comprising at least one pair of electrodes of opposite polarity, a rigid housing surrounding said electrodes, the walls of said housing consisting of a polymer and having a thickness sufficient to render them self-supporting, an electrolyte in said housing surrounding said electrodes and consisting of diluted sulfuric acid, the walls of said housing having a co-extensive thin layer firmly adhering thereto and consisting of a material having a substantially lower coefficient of water vapor diffusion than that of said polymer to deter escape of water vapor through said walls, said material being selected from the group consisting of an organopolysiloxane, polyvinylidene chloride and a metal, and a cover for said housing for sealing the top of said housing to prevent escape of water vapor therefrom during normal operation.

2. An electrical accumulator as claimed in claim 1 in which said layer consists of metal.

3. An electrical accumulator as claimed in claim 1 further comprising an anti-corrosion-coat provided on said layer so as to completely cover said layer, one face of said layer contacting said walls and the opposite side of said layer contacting said coat.

4. An electrical accumulator of the non-spillable, lead-acid type comprising negative electrodes, positive electrodes spaced therefrom, hollow spacers disposed between and in contact with said electrodes, each hollow spacer having an internal cavity and a pair of spaced parallel walls confining said cavity and formed by layers of porous fibrous material covering the opposed faces of said electrodes in contact therewith, a sulfuric acid electrolyte filling the space between said electrodes including said cavities and the pores of said layers, said electrolyte being formed by an aqueous thixotropic hydrogel constituting a colloidal solution of an additive in a diluted acid, a rigid housing encasing said electrodes, said spacers and said electrolyte, the walls of said housing consisting of a polymer and having a thickness sufficient to render said walls self-supporting, a thin layer adhering to said walls and being co-extensive therewith, the material of said layer having a coefficient of water vapor diffusion lower than that of said polymer to deter escape of water vapor through said walls, said material being selected from the group consisting of an organopolysiloxane, polyvinylidene chloride and metal, and a cover sealing said housing at its top to prevent escape of water vapor therefrom in normal operation.

References Cited by the Examiner

UNITED STATES PATENTS

| | | | |
|---|---|---|---|
| Re. 24,830 | 5/60 | Ruben | 136—6 |
| 2,404,126 | 7/46 | Duddy | 206—2 |
| 2,469,888 | 5/49 | Patnode | 260—448.2 |
| 2,575,337 | 11/51 | Ellis | 136—111 |
| 2,925,456 | 2/60 | Beusker et al. | 136—145 |
| 2,980,752 | 4/61 | Toce et al. | 136—166 |

FOREIGN PATENTS 785,848    11/57    Great Britain.

JOHN H. MACK, *Primary Examiner.*
MURRAY TILLMAN, *Examiner.*